June 28, 1927.
J. R. FOSTER ET AL
1,633,985
LIQUID DISPENSING APPARATUS
Filed Oct. 17, 1925
3 Sheets-Sheet 2
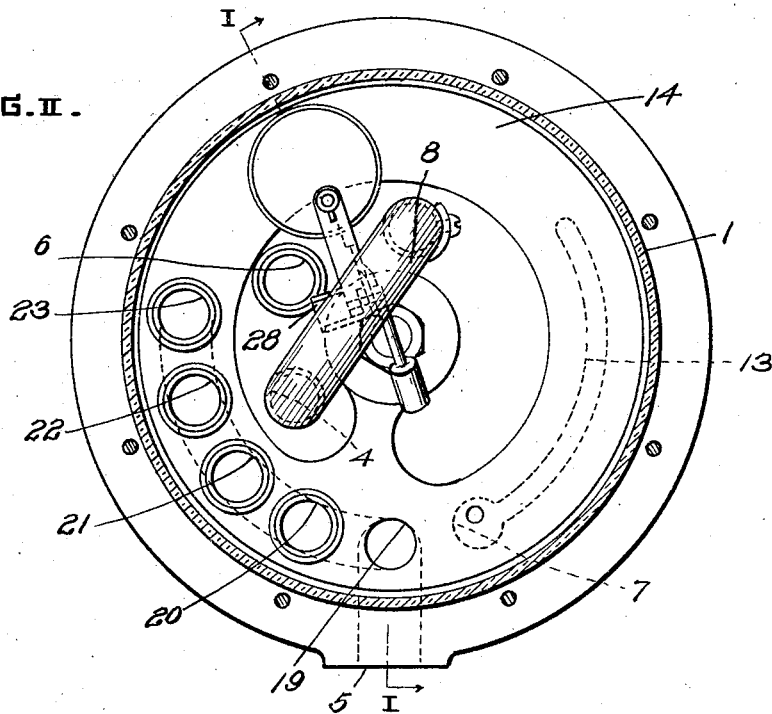
FIG.II.
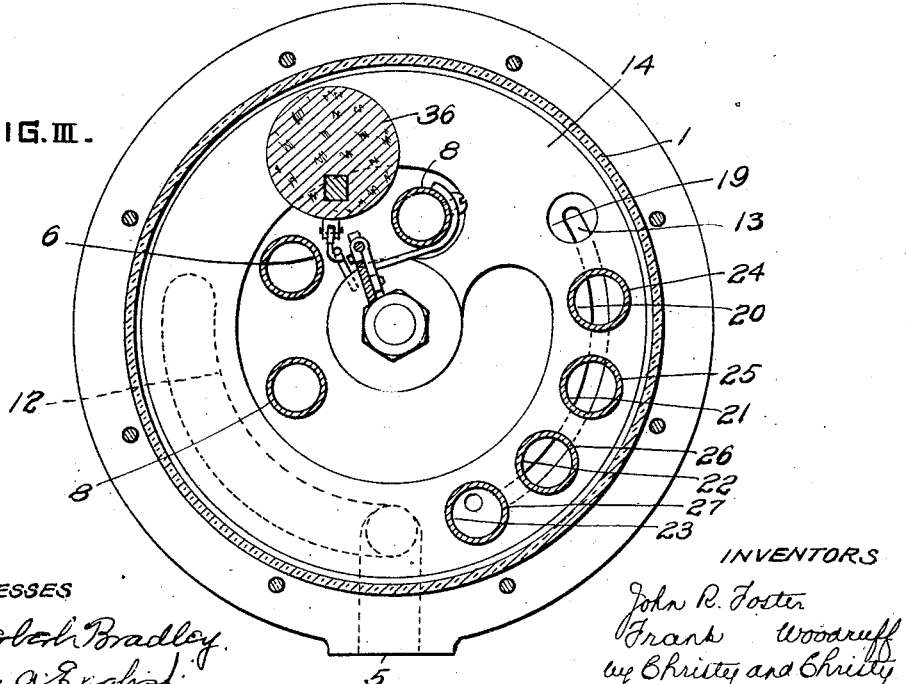
FIG.III.
WITNESSES
J. Herbert Bradley
Percy A. English
INVENTORS
John R. Foster
Frank Woodruff
by Christy and Christy
their Attorneys

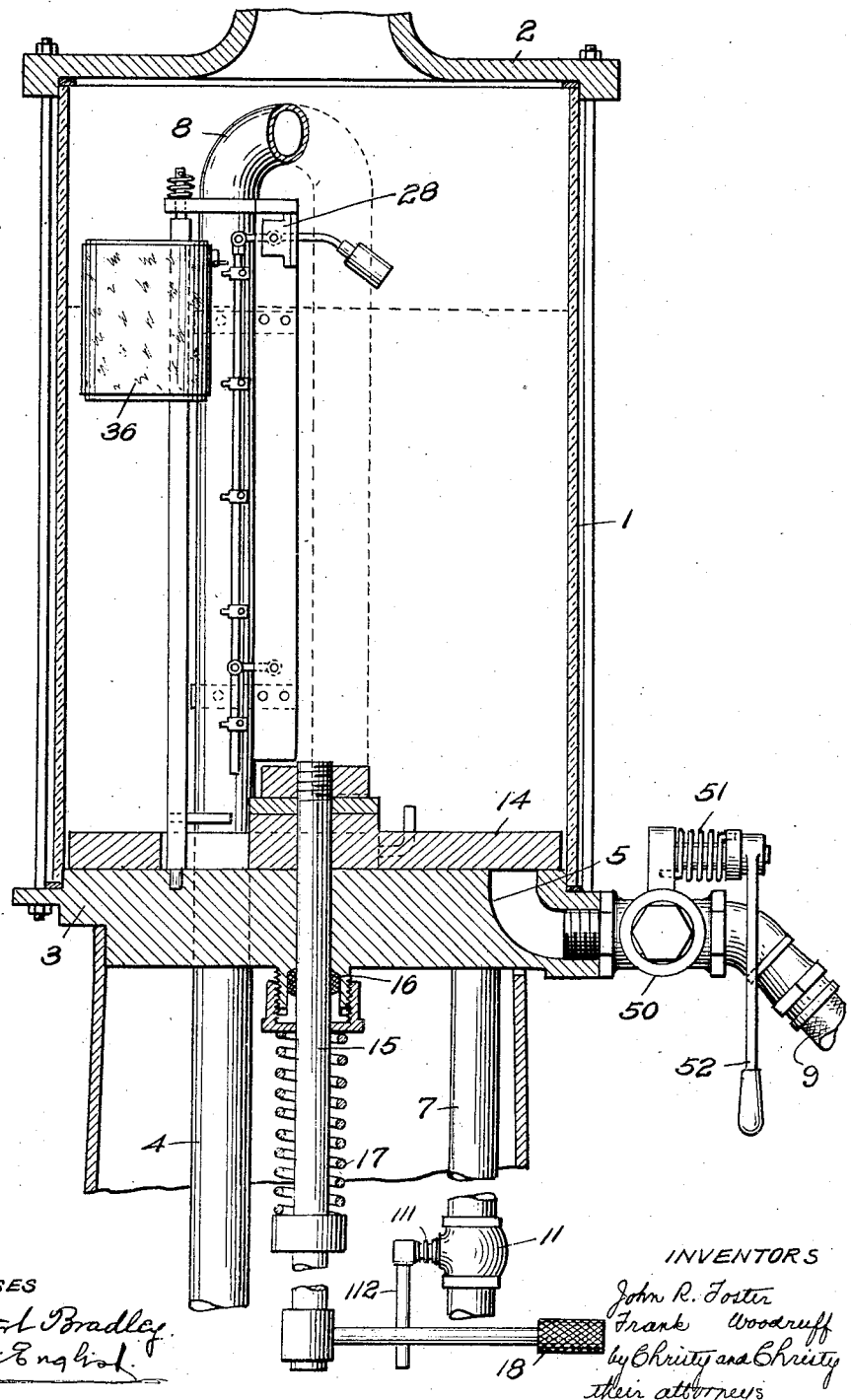

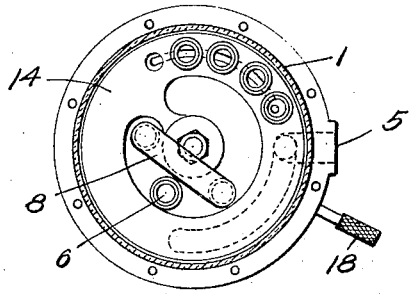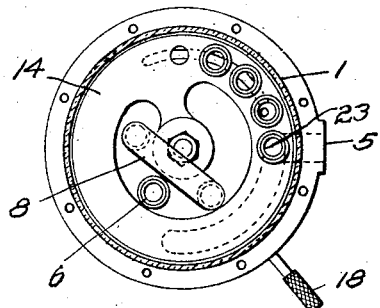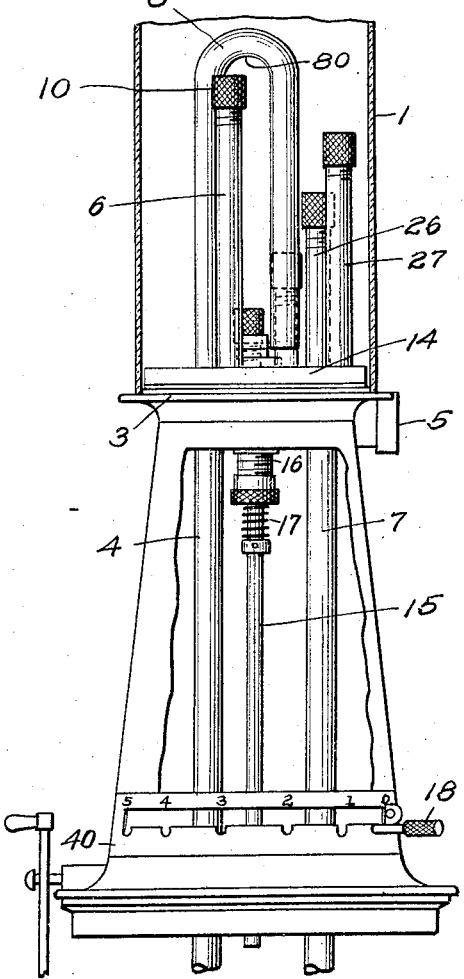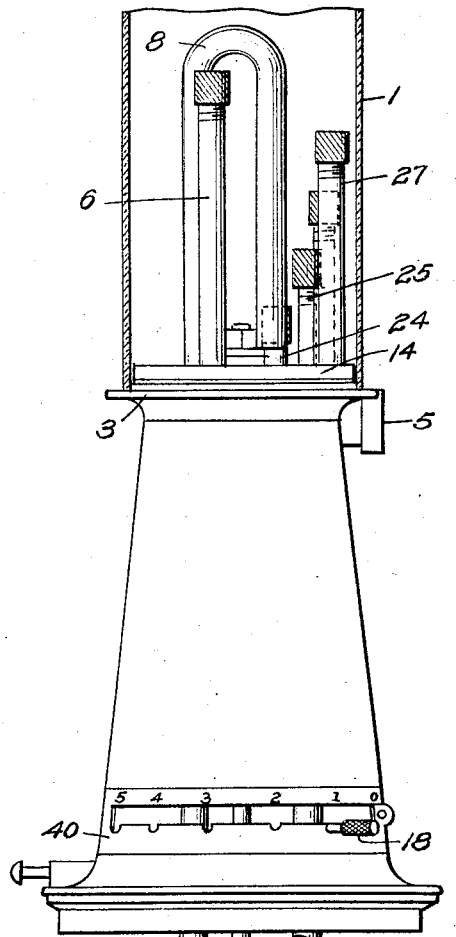

Patented June 28, 1927.

1,633,985

UNITED STATES PATENT OFFICE.

JOHN R. FOSTER AND FRANK WOODRUFF, OF ROCHESTER, PENNSYLVANIA, ASSIGNORS TO CORRECT MEASURE COMPANY, OF ROCHESTER, PENNSYLVANIA, A CORPORATION OF PENNSYLVANIA.

LIQUID-DISPENSING APPARATUS.

Application filed October 17, 1925. Serial No. 63,041.

This invention relates to improvements in liquid-dispensing apparatus, and finds practical application in apparatus for dispensing gasoline. The advantages of the improvements are simplicity, efficiency, and security as against fraudulent operation.

In the accompanying drawings Fig. I is a view in vertical and medial section through the measuring chamber of gasoline-dispensing apparatus in which the invention is embodied. Figs. II and III are views in horizontal section, the one on a plane adjacent the top, the other on a plane adjacent the bottom of the measuring chamber. In Fig. III the float 36 is shown in section, and with this point in mind it will be understood that Fig. III presents the apparatus after the measuring chamber has been emptied, and not while containing gasoline, as in Fig. I. Figs. IV and V are views in horizontal and vertical section and to smaller scale of apparatus differing in detail from that of Figs. I—III, but still embodying the invention. Fig. IV shows the parts in position corresponding to that of Fig. III. Figs. VI and VII are views corresponding to Figs. IV and V, and showing the parts in another position.

The measuring chamber conveniently takes the form of a transparent cylinder 1 of glass, bolted between metallic heads 2 and 3. Through the lower head 3, which constitutes the bottom of the measuring chamber, four orifices are formed. Through one of these orifices an inlet pipe 4 extends. This inlet pipe 4 is prolonged within the measuring chamber in a U-shaped termination 8 which preferably rises to a height within the measuring chamber exceeding the maximum height which in normal operation the introduced body of gasoline attains. From such maximum height the inlet pipe descends again to proximity to the bottom of the chamber, and the end of the pipe is open. It will be understood that suitable means are provided,—a pump, for instance,—for causing gasoline to flow when desired in sufficient stream through pipe 4 to fill the measuring chamber. In Fig. I the downwardly extending end of the inlet pipe is diagrammatically indicated in dotted lines. At the turn of pipe 8, at the point indicated at 80, Fig. V, a vent is formed through the pipe, to prevent siphon action within the pipe during operation.

A second orifice through the bottom of the measuring chamber gives passage to an overflow pipe 6, which leads to a suitable receptacle, ordinarily the subterranean storage tank, from which gasoline is pumped or drawn through inlet pipe 4 into the measuring chamber. The height of the overflow pipe 6 within the measuring chamber is such that when a sufficient quantity of gasoline has been introduced into the measuring chamber the overflow pipe, allowing the escape of surplus, will effect retention within the measuring chamber of an exactly measured maximum volume; for instance, five gallons. The overflow pipe 6 is provided with an adjustable rim 10, to the end that the accuracy of the measurement which it effects may be made precise.

Of the remaining orifices through the bottom of the measuring chamber, one, a delivery orifice 5, leads through a valve casing 50 to a delivery hose 9 of familiar character, through which gasoline flows to a customer's car, or to other receptacle. A fourth orifice opens to a return pipe 7, through which there is discharge by gravity to a suitable receptacle, ordinarily the same supply tank into which overflow pipe 6 makes delivery, and from which supply pipe 4 takes its supply.

In the valve casing 50 a cut-off valve is arranged. The valve is held normally by the tension of a spring 51 in closed position, and is shifted against spring tension to open position by means of a manually operable crank-arm 52. The valve in its particular structure possesses nothing of novelty, and its essential character will be understood from what has been said. One who makes use of the invention may particularly form this valve as he will. In the return pipe 7 also a valve casing 11 is arranged, and within this casing also is a cut-off valve, held normally by the tension of a spring 111 in closed position, and opened against spring tension by the swinging of a crank-arm 112.

On reference to Figs. II and III (cf. Figs. IV and VI) it will be observed that the inlet orifice and the overflow orifice are arranged at one radial interval from the axis of the cylindrical measuring chamber, and that the delivery orifice and the return orifice are arranged at another, and in this case at a greater interval from such axis. A valve is provided, in the form of a rotary plate 14, overlying the bottom of the measuring chamber, extending substantially to the periphery of the circular bottom of the measuring chamber, and bearing with liquid-tight engagement upon the surface of the bottom 3 of the measuring chamber. This valve, interfering in no respect with inlet and overflow, controls alternate escape of gasoline either through delivery orifice 5 or through return lead 7. The plate 14 is preferably circular, and is cut away in part, as indicated in Figs. II and III, IV and VI, to allow free turning, throughout the range of operation without interference (whatever be its position) with the inlet and overflow pipes which rise through the cut-away opening. Accordingly, the valve plate 14 becomes essentially an annulus, rotatable on its center, and by the ports formed in it and presently to be described, controlling orifice 5 and lead 7. The plate is carried on an axial stem 15, which is prolonged through a packing gland 16, and the plate is held to liquid-tight engagement upon the surface of the bottom of the measuring chamber by the tension of a spring 17, which engages a collar on the stem. The stem is provided with an operating crank arm 18.

The plate 14 is provided with a series of orifices, in this instance five, 19, 20, 21, 22, and 23, arranged in succession and remote from the center of turning an equal distance with orifices 5 and 7. Orifice 19 opens at the level of the upper surface of plate 14, while orifices 20, 21, 22, and 23 are provided with upward prolongations which take the form of standpipes 24, 25, 26, and 27. These stand pipes rise to different levels and are so particularly measured in height that, when the measuring chamber has been filled to the precisely defined maximum (in this case five gallons), precisely defined quantities may be taken through one or another of the orifices. And to this end, in the case in hand, it will be understood that through orifice 23 with its stand-pipe 27 one gallon may be drawn; through orifice 22, two gallons; through orifice 21, three gallons; through orifice 20, four gallons; and through orifice 19, which opens at the level of the valve plate, the whole five gallons. The stand-pipes 24, 25, 26, and 27 are provided at their upper ends with adjustment rims, similar to that with which overflow pipe 6 is provided, and for similar ends. This is a feature known already to the art.

The delivery orifice 5 (covered in Fig. II by the orifice 19 in plate 14 and, in Fig. VI, by the orifice 23 with its stand-pipe 27) and the return orifice 7 (covered in Figs. III and IV by the orifice 23) are separated by a distance as great as that between the successive orifices in plate 14, and the orifices 5 and 7 are prolonged in arc-shaped grooves, 12 and 13, formed in the upper surface of the bottom 3 of the measuring chamber, of equal radius and of equal extent with the arc-shaped succession of orifices 19, 20, 21, 22, 23, in plate 14. The groove 13, communicating with return lead 7, may advantageously be narrower than the orifice in plate 14. This correspondence of grooves to orifices in plate 14 will be understood on considering Figs. II, III, IV, and VI.

Referring particularly to Fig. I, the crank arm 112, by which the return valve is opened, is so arranged with respect to the crank arm 18 by which the valve plate 14 is rotated that, when the valve plate 14 is shifted to return position (Fig. III) the valve in return pipe 7 is by the engagement of the crank arms automatically opened. When the crank arm 18 is shifted again to another position, the valve in the return pipe closes automatically under spring tension. The valve casing 11 and the valve-shifting crank arm 112 may be arranged, as Fig. I indicates, within the walls of the fixture, and beyond the reach of tampering.

Fig. II shows the valve plate 14 in position for the delivery of the maximum volume, in this illustrative case, five gallons. Fig. III shows it in the position taken when the apparatus is out of service. When the valve plate is in the position shown in Fig. III, it will be understood that the crank-arm 18, by engagement with the crank-arm 112, is holding the valve in the return pipe 7 open, and whatever gasoline has remained after prior operation in the measuring chamber, has escaped and returned to the supply tank.

When the apparatus is to be used, and when say two gallons are to be supplied to a customer, the crank arm 18 is shifted to its properly identified position, bringing orifice 22 with its stand-pipe 26 to alignment with delivery orifice 5. Immediately on such shifting, the valve in the return pipe will close under spring tension. Then, automatically or otherwise, the means are brought into play by which gasoline is caused to flow through inlet pipe 4 to the measuring chamber. Filling continues till the surface of the contained body of gasoline rises to the rim of the overflow pipe 6 and presently ceases. The presence of overflow pipe 6 is effective to leave in the measuring chamber precisely the predetermined maximum volume, no more, no less.

When filling has so been accomplished, crank arm 52 is swung, the delivery orifice opened, and through stand pipe 26 precisely two gallons of gasoline, no more, no less, pass to the consumer. When crank arm 52 is released, the valve in the delivery line will close automatically under spring tension.

Three gallons remain. These or any part of them may be withdrawn by appropriate shifting of valve plate 14, followed by swinging of crank-arm 52. And, when delivery is completed, the valve plate 14 may be shifted again to the position shown in Fig. III, whereupon whatever gasoline remains in the measuring chamber will automatically be returned through lead 7 to the supply tank.

Accordingly as orifices 23, 22, 21, 20, and 19 are so brought to registry with orifice 5, the delivery will be of one, two, three, four, or five gallons; and, part having already been withdrawn, a new shifting may effect a further withdrawal of part or of all that remains.

If any of orifices 22, 21, 20, or 19 be brought to registry with orifice 5, the stand-pipes of greater height will, by virtue of the presence of groove 12, cooperate in delivery. And when the valve-plate 14 has been brought to the position shown in Fig. III, all which remain submerged of the orifices in valve-plate 14 will, by virtue of the presence of groove 13, cooperate in the return of gasoline through lead 7.

In Figs. IV—VII a convenient scale is shown, by which the movements of the crank-arm 18 may be accurately controlled. The crank-arm 18, swinging horizontally, protrudes through a slot in the casing wall 40. The slot is notched, and by engagement with the notches the crank-arm 18 may be brought to either of the desired particular positions. In this instance the measuring chamber may be understood to have a capacity of five gallons and the apparatus may be understood to have the capacity to deliver one, two, three, four, or five gallons, as may be desired. Accordingly, the slot is notched with six notches, and opposite the notches are set the characters 0, 1, 2, 3, 4, and 5. When the crank-arm 18 rests in the notch marked 0, the position shown in Fig. V, it will be understood that the valve plate 14 is in the position shown in Fig. IV, and by engagement of crank-arm 18 with crank-arm 112 within the casing, the valve in the return pipe 7 is open. In this position there is an open way of return of all gasoline which may have remained in the measuring chamber, back to the source of supply. When crank-arm 18 is shifted to the notch marked 1, the valve in the return pipe immediately closes, and stand-pipe 27 is brought to alignment above delivery orifice 5. The measuring chamber may then be filled. After it has been filled, and exactly five gallons remain, the delivery valve may be opened and one gallon drawn off. So with the successive positions 2, 3, 4, and 5 of the scale. They indicate accurately the positions requisite, that two, three, four, or five gallons may be drawn off.

The float 36 shown in Figs. I—III, forms part of means for operating a talley meter 28, so that as the float descends the tally-meter is driven; and means are provided for effecting a disconnection in the line of operation of the tally meter, when the valve-plate 14 is shifted to the gasoline returning position of Fig. III. These are matters which are made the subject-matter of an application of George W. Mackenzie, filed July 29, 1925, Serial No. 46,756, and appear here only as part of the particular installation illustrated.

We claim as our invention:

1. In liquid-dispensing apparatus a measuring chamber provided with a delivery orifice and a return orifice, a return conduit leading from the return orifice, a valve in the return conduit, a valve within the measuring chamber provided with a plurality of orifices opening at different levels within the measuring chamber, said valve being movable from return position to successive positions of registry of its orifices with the delivery orifice, and back again to return position, the said valve in the return pipe, otherwise closed, being movable from its normally closed to its open position by the shifting of the said valve in the measuring chamber to return position.

2. In liquid-dispensing apparatus a vertically standing, cylindrical measuring chamber, means for segregating within the measuring chamber a predetermined maximum volume of gasoline, a valve plate rotary upon the floor of the measuring chamber and provided with a series of orifices opening through the valve plate from different effective heights within the measuring chamber and arranged in arc-shaped succession with respect to the center of turning, a delivery orifice and a return orifice formed through the floor of the measuring chamber at equal radial distance with the orifices in the valve plate from the center of turning, the bottom of the measuring chamber being further provided with grooves extending oppositely from the two orifices and arc-shaped with respect to the center of turning and each groove of equal extent with the series of orifices in the valve plate, a conduit leading from each of the orifices through the floor of the measuring chamber, and a valve in each of said conduits.

3. In liquid-dispensing apparatus a vertically standing, cylindrical measuring chamber, inlet and overflow orifices formed through the floor of the measuring chamber, delivery and return orifices formed through the floor of the measuring chamber, equidistant from the cylinder axis and at a distance from the cylinder axis other than that at which the aforesaid inlet and overflow orifices are arranged, a valve plate rotary upon the floor of the measuring chamber and upon the cylinder axis as its center of turning, said valve being provided with a series of orifices opening at different effective heights within the measuring chamber and arranged in arc-shaped succession and at a radial distance from the center of turning corresponding to that of the delivery and return orifices, inlet and overflow pipes rising within the measuring chamber from the inlet and overflow orifices in the floor of the measuring chamber, delivery and return conduits leading from the delivery and return orifices in the floor of the measuring chamber, and valves in said delivery and return conduits.

In testimony whereof we have hereunto set our hands.

JOHN R. FOSTER.
FRANK WOODRUFF.